Feb. 21, 1928.
W. J. DEAN
1,659,908
TRANSMISSION DEVICE FOR AUTOMOBILES
Filed May 15, 1925
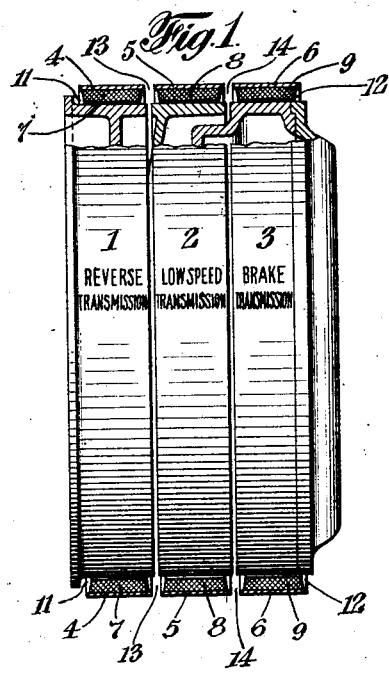
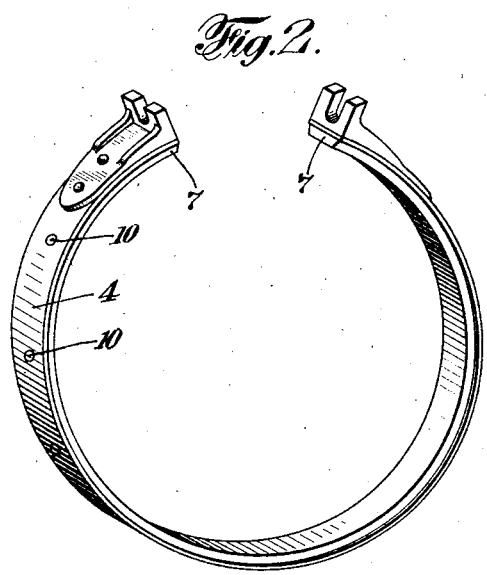
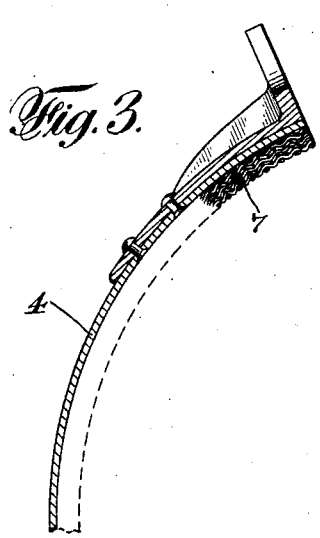
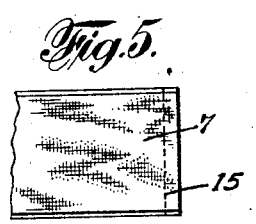
Inventor
William J. Dean
By his Attorneys
Prindle, Wright, Neal & Bean Patented Feb. 21, 1928.

1,659,908

UNITED STATES PATENT OFFICE.

WILLIAM J. DEAN, OF PATERSON, NEW JERSEY, ASSIGNOR TO SUPERWEAR MANUFACTURING CORPORATION, A CORPORATION OF NEW YORK.

TRANSMISSION DEVICE FOR AUTOMOBILES.

Application filed May 15, 1925. Serial No. 30,453.

My invention relates to a device comprising a transmission equipment for use in connection with motors, but has especial relation to such devices as used in connection with automobiles.

The object of my invention is to provide a device of the above character with a lining which is more effective than the previous equipment used for this purpose inasmuch as the construction is such as to prevent the lining from compacting and becoming hard, thus avoiding frequent replacement. In the construction made in accordance with my invention I provide a lining with beveled sides, thus causing the friction surface of the lining to be effectively lubricated and cooled, owing to the tendency of the lining to continually force some of the surrounding oil inwardly beneath the lining and over the friction surface. This is especially advantageous where several of the linings are provided adjacent one another, as between the adjacent linings there will be provided a canal which is always filled with oil so as to provide an effective feeding of the oil over the friction surface. Furthermore, because of the bevel sides the linings will not work over onto the adjoining drums, thus avoiding undue wear, loss of power and the frequent breakage of the "low speed" and "reverse" drums. Also, as one of the end drums is flanged the bevel side will fit better over the same. Further objects of my invention will appear from the detailed description of the same hereinafter.

While my invention is capable of being carried out in many different ways, by way of illustration I have shown only one form of the same in the accompanying drawings, in which—

Figure 1 is a vertical section of a transmission device equipped with the lining made in accordance with my invention;

Figure 2 is a perspective view of one of the transmission bands carrying a lining made in accordance with my invention;

Figure 3 is a diagrammatic view showing a longitudinal section of a lining used in connection with my invention;

Figure 4 is a similar view showing a cross section of the same; and

Figure 5 is a plan view of one of the ends of the lining, both of which are alike.

In carrying out my invention, it is to be understood that the transmission equipment may be of any desired type, as, for example, any of the transmission devices using linings, and especially any automobile transmission device provided with a lining, but, by way of example, my invention may be applied particularly to the transmission used on the Ford automobile and which is comprised of three drums 1, 2 and 3 adjacent to each other and provided, respectively, for the "transmission reverse", "transmission low speed" and "transmission brake". It will be understood that these three drums rotate in a bath of lubricating oil in the normal operation of the automobile. The said drums 1, 2 and 3 are, furthermore, provided with transmission bands 4, 5 and 6, respectively, said bands being constructed substantially the same as one another and being provided with linings 7, 8 and 9. These linings 7, 8 and 9 are all of the same shape and of the same material. The transmission linings are made preferably of woven cotton material, although other fibres may be used for this purpose, if desired, as, for example, linen, etc. Furthermore, as shown in the drawings, the sides of the lining are beveled so that the inner face of the lining is narrower than the outer surface of the same, due to the fact that preferably the lining is woven with a fewer number of yarns in the undersurface than in the outersurface of the same. The three linings 7, 8 and 9 are secured to their respective transmission bands 4, 5 and 6 by means of rivets 10. If desired, the two ends of the lining may be stitched across the same with stitching 15 to avoid ravelling. When in position they consequently provide, not only angular recesses 11 and 12 adjacent to the main body of oil surrounding the transmission, but also triangularly shaped recesses 13 and 14 between the adjacent sides of the linings, each of which is comprised of two of such angular recesses, so that both sides of each of the transmission linings are, thus, at all times adjacent to a body of the lubricating oil. Owing to the shape of the angular recesses, the linings will, in the operation of the transmission, cause the oil to be forced inwardly along the friction surfaces, that is to say, the outer faces of the drums 1, 2 and 3 and the inner faces of the linings 7, 8 and 9. Furthermore, by reason of the bodies of oil present in these different recesses there will be a distinct cooling effect so as to prevent undue heating and burning of the linings. Therefore, the linings will wear for a very long time and will not require replacement as often as would otherwise be the case. Also, the linings will not work over on to adjoining drums, thus avoiding undue wear, loss in power and breakage of the drums.

While I have described my invention above in detail I wish it to be understood that many changes may be made therein without departing from the spirit of the same.

I claim:

1. A transmission lining having an unconfined beveled side.

2. A transmission lining having an unconfined beveled side at both sides thereof, thus providing a narrow face for the same.

3. In combination, a transmission band and continuous transmission lining of woven cotton extending throughout the length of the transmission band having a beveled side.

4. In combination, a transmission band and continuous transmission lining of woven cotton extending throughout the length of the transmission band having a beveled side at both sides thereof, thus providing a narrow face for the same.

5. In combination, a transmission band and a transmission lining having an unconfined beveled side.

6. In combination, a transmission band and a transmission lining having an unconfined beveled side at both sides thereof, thus providing a narrow face for the same.

7. In combination, a transmission band and a transmission lining having an unconfined beveled side at both sides thereof, thus providing a narrow inner face for the same.

8. In combination, a plurality of adjacent transmission bands, each of the same being provided with a transmission lining having an unconfined beveled side at both sides thereof, thus providing a narrow inner face for the same, and inwardly enlarging oil canals between the adjacent sides of the transmission linings.

9. In combination, a transmission band, a transmission lining not extending to the edge of the same and a drum extending beyond the sides of the transmission lining.

10. In combination, a plurality of adjacent transmission bands, transmission linings for the bands not extending to the edges of the same and drums extending beyond the sides of the corresponding transmission linings.

In testimony that I claim the forgoing, I have hereunto set my hand this 13th day of May, 1925.

WILLIAM J. DEAN.